United States Patent [19]

Chao et al.

[11] 4,209,188

[45] Jun. 24, 1980

[54] MICROCAPSULES, METHOD OF MAKING SAME, AND CARBONLESS COPYING SYSTEM INCLUDING SAID MICROCAPSULES

[75] Inventors: Hung-Ya Chao, Williamsville; George E. Maalouf, Niagara, both of N.Y.

[73] Assignee: Moore Business Forms, Inc., Grand Island, N.Y.

[21] Appl. No.: 895,450

[22] Filed: Apr. 11, 1978

[51] Int. Cl.$^2$ .................. B41M 5/16; B41M 5/22; B01J 13/02

[52] U.S. Cl. ................................ 282/27.5; 252/316; 427/150; 427/151; 427/338; 427/340; 428/307; 428/914

[58] Field of Search ............... 252/316; 282/27.5; 427/338, 340; 428/307, 914, 413, 327

[56] References Cited

U.S. PATENT DOCUMENTS

| | | | |
|---|---|---|---|
| 3,016,308 | 1/1962 | Macaulay | 282/27.5 |
| 3,429,827 | 2/1969 | Ruus | 252/316 |
| 3,578,605 | 5/1971 | Baxter | 252/316 |
| 4,000,087 | 12/1976 | Maalouf | 428/307 X |

FOREIGN PATENT DOCUMENTS 1257178 12/1971 United Kingdom .................. 252/316

*Primary Examiner*—Richard D. Lovering
*Attorney, Agent, or Firm*—Watson, Cole, Grindle & Watson

[57] ABSTRACT

Disclosed are improved microcapsules comprising a core of fill material, at least one generally continuous wall encapsulating the core, and the reaction product of a methylolated epoxy compound and material of the outermost wall as at least a portion of the outermost surface of the microcapsule, the reaction product, among other things, tending to close discontinuities in the encapsulating wall. When containing a colorless dye precursor and utilized in carbonless copying systems, the improved microcapsules help to reduce discoloration caused by leakage or premature rupture and release of the dye precursor while still providing good image intensity of marks produced by the system. Also disclosed are methods of making the improved microcapsules.

45 Claims, No Drawings

MICROCAPSULES, METHOD OF MAKING SAME, AND CARBONLESS COPYING SYSTEM INCLUDING SAID MICROCAPSULES

BACKGROUND OF THE INVENTION

The present invention relates to improved microcapsules and methods for making the same. More specifically, the improved microcapsules each comprise a core of fill material, at least one generally continuous wall encapsulating the core and the reaction product of a methylolated epoxy compound and material of the outermost wall as at least a portion of the outermost surface of the microcapsule. A method of making the improved microcapsules of the present invention comprises providing microcapsules including a core of fill material and at least one wall encapsulating the core and then reacting a methylolated epoxy emulsion with the outer surfaces of the wall of the microcapsule. The resultant microcapsules have improved properties making them adaptable for a variety of applications, particularly for use in carbonless copying systems.

Microcapsules generally comprise a core of fill material, typically having a size in the range of microns, surrounded by a wall or shell of polymeric type material. The fill material may be either gaseous, liquid or solid and may be composed of a single substance, a solution or a mixture. The wall surrounding the core of fill material typically functions to isolate the fill material from an external environment until it is desired to have the fill material available at which time the capsule wall is ruptured or removed in some fashion such as by mechanical pressure, dissolution or the like. Certain types of microcapsules are intended to remain intact without removal or rupture of the capsule wall such as microspheres, microbeads and the like.

Uses for microcapsules are almost as varied as the materials that may be microencapsulated. Of particular importance are the use of microcapsules, in medicinal preparations, fertilizers, flavorings, detergents, laundry brighteners, perfumes, disinfectants, deodorizers, adhesives, carbonless copying systems and the like.

The patent literature is replete with methods or techniques for preparing microcapsules and microcapsular products. A great majority of these methods generally comprise providing a dispersed phase of minute discrete droplets containing the intended fill material in a continuous phase and then forming encapsulating walls or shells about the minute droplets. Specific methods for forming the encapsulating walls about the droplets include simple and complex coacervation, interfacial polymerization, polycondensation and the like. Specific patents relating to microencapsulation methods include U.S. Pat. No. 3,429,827 to Ruus, relating to an interfacial polycondensation type method, U.S. Pat. No. 3,578,605 to Baxter, relating to an acid chloride-gelatin-gum arabic dual-wall type method and U.S. Pat. No. 3,016,308 to Macaulay, relating to a urea-formaldehyde condensation type method, among others.

While microcapsules and microencapsulation techniques are applicable to a wide variety of products, perhaps one of the most significant applications is in their use in carbonless copying systems. While the present invention is particularly adaptable to carbonless copying systems and will be discussed primarily hereinafter with regard to such systems, it should be understood that the invention is not thereby so limited and may be used in any application where the improved properties of the microcapsules are beneficial.

As is generally known in the art, carbonless copying systems generally comprise a plurality of paper sheets or webs arranged in a manifold set, each sheet or web of the set having one or more coatings on the surfaces thereof. The manifold set is designed so that when a marking pressure caused by a means such as a typewriter, pen, stylus or the like is applied to the outermost sheet, a colored mark will be formed on at least one surface of each sheet of the manifold set.

To this end, the top sheet of the manifold set to which the marking pressure is applied is provided with a coating on its back surface, the coating including microcapsules containing an initially colorless chemically reactive color forming dye precursor as the fill material. The upper surface of the sheet contiguous to the back surface of the top sheet is coated with a material containing a component capable of reacting with the colorless dye precursor contained in the microcapsules to produce a color. Thus a marking pressure on the upper surface of the top sheet will rupture the microcapsules on the bottom surface and thereby release the colorless dye precursor. The colorless dye precursor, upon contact with the reactive component of the coating of the lower sheet, will chemically react to produce a colored mark corresponding to the area of marking pressure. In a like fashion, colored marks are produced on each succeeding sheet of the manifold set by the marking pressure rupturing microcapsules carried on the lower surfaces of each sheet.

The sheets of the manifold set in carbonless copying systems are designated in the art by the terms CB, CFB, and CF which stand respectively for "coated back", "coated front and back", and "coated front". The CB sheet is usually the top sheet of the manifold set and the sheet upon which the marking pressure is applied; the CFB sheets are the intermediate sheets of the manifold set, each of which is able to have a mark formed on its front surface by a marking pressure and each of which also transmits the contents of ruptured microcapsules from its back surface to the front surface of the next succeeding sheet; and the CF sheet is the bottom sheet and is only coated on its front surface so that an image may be formed thereon.

While it is generally customary to have the coating containing the microcapsules on the back surface of the sheets and to have the coating containing the reactive component for the capsule content on the front surface of each of the sheets, a reverse arrangement may also be utilized. In addition, in some systems the coatings need not be used at all and the reactive ingredients may be carried in the sheets themselves, or one may be carried in one of the sheets and the other may be carried as a surface coating. Further, the reactive component for the colorless dye precursor may also be microencapsulated. Patents illustrative of many of the various kinds of systems which may be used in the production of manifold carbonless copying systems include, for example, U.S. Pat. No. 2,299,694 to Green, U.S. Pat. No. 2,712,507 to Green, U.S. Pat. No. 3,016,308 to Macaulay, U.S. Pat. No. 3,429,827 to Ruus and U.S. Pat. No. 3,720,534 to Macaulay et al.

As indicated above, a variety of arrangements exist for providing carbonless copying systems, the most common arrangement and the arrangement to which the present invention is particularly adaptable, is a system where microcapsules having a fill material including an initially colorless, chemically reactive, color forming dye precursor are coated on the back surfaces of each of the sheets of the manifold set and a dry coating containing a reactive component for the dye precursor is coated on the front surfaces of each of the sheets of the manifold set. One shortcoming of such carbonless copying systems is the tendency for the inadvertent and unintentional development of color on the CF coatings and the CB sheet. This inadvertent color development may be caused by the presence of free colorless dye precursor in the CB coatings due to incomplete encapsulation of the dye precursor or may be caused by accidental microcapsule rupture which can occur during halding, coating processes, printing processes and the like. In addition, the walls of the microcapsules may include faults or pores which allow the colorless dye precursor to thereby leak from the microcapsules. This free dye precursor often causes discoloration by contacting the CF component by passing through the base paper in the CFB sheets and also from sheet to sheet in a manifold set. Discoloration, which is variously referred to as blush, offset, bluing, ghosting, back print, etc. is highly objectionable and undesirable in a copying system.

A solution that has been proposed for these types of discoloration in carbonless copying systems is set forth in U.S. Pat. No. 4,000,087 to Maalouf. The patent teaches that microcapsules containing an initially colorless chemically reactive color forming dye precursor and a carrier therefor as the fill material and having generally continuous polyamide walls are rendered more resistant to inadvertent release and transfer of the fill material by incorporating into the fill material a resin selected from polystyrene resin and epoxy resin. While the solution for discoloration problems proposed by this patent has proved to be highly satisfactory, its applicability is limited to those microcapsules having a fill material compatible with a polystyrene or epoxy resin. In many carbonless copying systems utilizing microcapsules, the fill material of the microcapsules, especially the carriers for the colorless dye precursor, are not compatible with polystyrene and/or epoxy resins.

In addition, British Pat. No. 1,257,178 to Pilot Man-Nen-Hitsee Kabushik Kaisha proposes a method for making multilayer microcapsules such that the result microcapsules allegedly are not easily broken while being handled and avoid any percolation, moisture absorption, evaporation, oxidation, etc. of the encapsulated liquids and protect the contents in a chemically stabilized manner. The method of this patent is specifically directed to the manufacture of multilayer microcapsules contained liquid, using a hydrophobic material, a hydrophobic liquid, a hydrophilic liquid, one of the said materials containing two or more reactive functional groups so that the said hydrophobic material and the said hydrophilic material are capable of reacting interfacially at an interface between the hydrophobic liquid and the hydrophilic liquid thereby to form a high-polymer film insoluble in both of the said liquids. The method comprises dispersing either one of the said liquids, said one of said liquids containing the hydrophobic or hydrophilic material according as the liquid is hydrophobic or hydrophilic, in the form of fine droplets in other liquid; causing a primary film to form on the surfaces of the said dispersed droplets thereby to prepare a suspension of microencapsulated liquid droplets; and adding the other said material to the said suspension, whereby the two said materials react together at any defects in the primary film to form a secondary film layer. A disadvantage of this method is that one of the materials to be reacted to form the secondary film layer must be included in the intended fill material.

SUMMARY OF THE INVENTION

It is therefore an object of the present invention to provide microcapsules adapted for use in carbonless copying systems which tend to reduce objectionable discoloration such as blush, offset, bluing, ghosting, back print and the like. Another object of the present invention is to provide microcapsules for use in carbonless copying systems such that they can be used in conjunction with acid base bond paper without significant discoloration, back print and the like. Yet another object of the present invention is to provide methods for producing these improved microcapsules. Yet another object of the present invention is to provide improved microcapsules wherein discontinuities in the initial wall are closed by the reaction product of a methylolated epoxy compound and the material of the wall.

In its broadest aspects, the present invention comprehends a microcapsule comprising a core of fill material, at least one generally continuous wall encapsulating the core, and the reaction product of a methylolated epoxy compound and material of the outermost wall as at least a portion of the outermost surface of the microcapsule. The present invention also comprehends a microcapsule comprising a minute, discrete droplet of fill material, an individual rupturable, generally continuous wall encapsulating the droplet, the wall comprising at least one layer of material, discontinuities in the outermost layer being closed by the reaction product of a methylolated epoxy compound and material of the outermost layer. A method of making these improved microcapsules in accordance with the present invention comprises the steps of providing microcapsules, each including a core of fill material and at least one generally continuous wall encapsulating the core, and then reacting a methylolated epoxy emulsion with the outer surfaces of the walls of the microcapsules. Also contemplated by the present invention are carbonless copying systems including the improved microcapsules according to the present invention.

Further objects, advantages and features of the present invention will become more apparent from a detailed consideration of the remainder of the specification including the examples and the appended claims.

DETAILED DESCRIPTION OF THE PREFERRED EMBODIMENTS

It is believed that the concepts of the present invention are applicable to many types of microcapsules and that certain beneficial results will flow from the use thereof. The concepts of the invention are especially applicable to microcapsules of the type obtained from the teachings of Ruus in U.S. Pat. No. 3,429,827, of Baxter in U.S. Pat. No. 3,578,605 and of Macaulay in U.S. Pat. No. 3,016,308 the disclosures of which are hereby incorporated into this disclosure by reference. The method as taught by Ruus is an interfacial polycondensation type method of producing microcapsules. This method includes the steps of producing an aqueous dispersion of a water-immiscible organic liquid containing one or more reactants, and then adding a second reactant of group of reactants to the dispersion whereupon the reactants form a polymer wall at the interface between the dispersion and continuous phase. As an example, the organic dispersed phase may contain compounds such as diacid chloride, mixtures of diacid chloride and disulfonyl chloride, and the aqueous continuous phase may contain compounds such as hexamethylenediamine, ethylenediamine, diethylenetriamine, triethylenetetramine, tetraethylenepentamine, or mixtures of a polyamine and polyol such as bisphenol A, thus forming microcapsules having a polyamide or copolyamide wall.

The method of making microcapsules as taught by Baxter may be generally termed a dual-wall method. In this method, microcapsules are prepared by forming an oil in gelatin-gum arabic aqueous emulsion, the oil containing a small amount of diacid chloride. The diacid chloride of the oil reacts with the gelatin molecules of the emulsion to form an inner wall for the microcapsule and releases hydrogen chloride which in turn induces coacervation between the gelatin and gum arabic and thereby forms an outer wall on the microcapsule. Optionally, the microcapsules may be hardened by treating with a formaldehyde solution.

A method of forming microcapsules as taught by Macaulay may be generally termed an urea-formaldehyde condensation method. This method includes the steps of forming a low molecular weight urea-formaldehyde precondensate followed by mixing the precondensate with a fill material, dispersing the fill material into microdroplets and then, by adjusting the pH of the mixture to acidity, forming a high molecular weight urea-formaldehyde condensate over the microdroplets which thereby forms the walls of the microcapsules.

According to the concepts of the present invention, once microcapsules have been formed, a methylolated epoxy compound is reacted with the outer surfaces of the microcapsules to thereby yield improved microcapsules.

The term methylolated epoxy compound as used herein may be defined as an epoxy type compound or resin having one or more methylol groups and includes methylolated epoxy compounds of the structure formula;

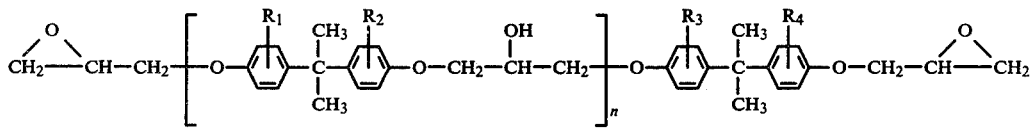

where $R_1$, $R_2$, $R_3$ and $R_4$ are selected from —H or —CH$_2$OH provided that at least one of the R groups of the compound is CH$_2$OH and where n is an integer from 0 to 3. Preferably n is 0 or 1 since when n is a higher integer, the epoxy compound tends to become a solid, especially when n is 4 or more, and is therefore more difficult to be made into a useful emulsion. Generally, methylolated epoxy compounds having an epoxide equivalent within the range of about 200 to 750 perform reasonably well for the purposes of the present invention, preferably, the epoxide equivalent is from 200 to about 380.

The methylol groups of the epoxy compound enhance the reactivity of the compound so that the compound is able to provide the desired improved mirocapsules. It has been found that the use of general purpose types of epoxy emulsions such as the emulsion made by emulsifying Genepoxy 190 (General Mills, Inc.) and the emulsions made by emulsifying Epon 828, 834 and 836 (sheel chemicals) do not seem to provide the desired improved microcapsules when brought into reactive contact. The epoxy compound is preferably in emulsion form which helps the compound to react with the individual microcapsules. If the epoxy compound is added directly to a microcapsule slurry, the benefits of the present invention may not be obtained.

One method of reacting the methylolated epoxy compound with the microcapsules, which is particularly applicable to microcapsules formed in a liquid vehicle, is to simply add the epoxy compound dispersed as an emulsion in the same type liquid vehicle to the vehicle containing microcapsules after formation of the microcapsules. In such a method, preferably, the amount of epoxy compound which is added may vary from about 2 to about 20 weight percent of the dry weight of the microcapsules contained therein. Preferably, the amount of epoxy compound added is about 2 to 10 weight percent, most preferably, about 5 weight percent, of the dry weight of the microcapsules. The pH of the microcapsule slurry prior to the addition of epoxy compound is not believed to be critical for the reaction, in practice, the pH is generally in the range of about 5 to 9. In addition, the epoxy compound may be added to the microcapsules at any time after about 2 hours of reaction time in the preparation of the initial microcapsule wall.

As mentioned previously, the microcapsules of the present invention are preferably utilized in carbonless copying systems so as to reduce or substantially eliminate discoloration type problems which are encountered in carbonless copying systems which utilize conventional microcapsules. While it is not entirely understood why microcapsules including the reaction product of a methylolated epoxy compound and the outermost surfaces of the wall tend to produce these improved results, it is believed that the epoxy and hydroxymethyl groups of the methylolated epoxy compound react with the free amino groups of the wall of the microcapsules and thus tend to produce a more cross-linked and less permeable wall structure for the microcapsules. Discontinuities in the initial microcapsule wall also tend to be closed by the reaction of the outermost surface of the wall with epoxy compound. The microcapsule walls may also become tougher due to the balanced hardness and flexibility characteristics of the epoxy compounds. If such is the case, the toughened capsules are less likely to rupture under non-marking pressure such as the pressures encountered during handling, coating and other associated processes and thus discoloration is less likely to result.

The present invention is particularly adaptable to carbonless copying systems which utilize a colorless dye precursor of the general structure;

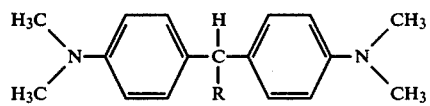

When R is a hydroxy group, the precursor is generally known as Michler's hydrol. Various other derivatives of the above compound are known as the methyl ether, the benzyl ether p-nitrobenzyl ether, the bis (1,4-benzene dimethanol) ether, the acetophenone oxime ether, the 2-benzothiazole thio ether, p-toluene sulfinate, and the morpholine derivative, all of Michler's Hydrol, and as N-(m-trifluorophenyl) leucoauramine. Conventional microcapsules containing these precursors, when used in a carbonless copying system, tend to produce significant CF discoloration and exhibit a bluish color and back print on acid type paper. The use of microcapsules according to the present invention tends to reduce or even eliminate these undesireable characteristics.

Although the above mentioned dye precursors are the preferred precursors to be used with microcapsules of the present invention, it should be understood that the concepts of the invention are equally applicable to microcapsules containing other types of colorless dye precursors known in the art of carbonless copying systems.

The concepts of the present invention are more clearly illustrated in the following examples where various types of microcapsules are prepared using the methods of the present invention, the resultant microcapsules then being tested as a component of a carbonless copying system. It should be understood that the examples are given for the purposes of illustration only and the examples do not limit the invention as has heretofore been described.

EXAMPLE I

Microcapsules are prepared generally by a method as taught in the patent to Ruus mentioned previously and then an emulsion containing a methylolated epoxy compound is reacted with the formed walls of the microcapsules to yield improved microcapsules.

To prepare the initial microcapsules, about 3.04 g of terephthaloyl chloride (TPC) and about 1.00 g of p-toluene sulfinate of Michler's hydrol (PTSMH) are dissolved in about 30 g of dibutyl phthalate (DBP) and then this mixture emulsified with a 2% Elvanol 50–42 (a partially hydrolyzed polyvinyl alcohol from the DuPont Company) for about 2 minutes. A mixture of about 1.54 g of diethylene triamine (DET), about 1.15 g sodium carbonate and about 40 ml of water is prepared and then added to the emulsion. The entire mixture is stirred for about 20 hours when a stable pH of about 7 is observed. The resultant microcapsules have a core containing PTSMH dissolved in DBP and encapsulating wall of the polyamide polyterephthalamide.

A batch containing the above microcapsules is then coated on a 13 pound neutral base continuous bond paper sheet with a coating rate of approximately 2.30 to about 3.00 g per square meter. The coated sheet is then oven dried at a temperature of about 105° C. for about 45 seconds. The resultant coated paper containing microcapsules is designated as the reference sheet and is utilized for comparison purposes.

To a second batch of the above initial microcapsules, about 4.0 g of Apogen 401 (a 50 percent aqueous dispersion of a methylolated epichlorohydrin/bisphenol A type resin sold by Schaefer Chemical Company) is added and then stirred for about 3 hours. The modified resin of Apogen 401 has the structural formula of

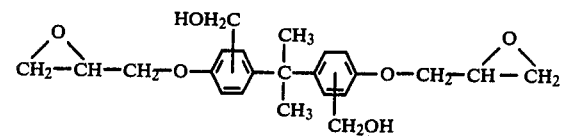

The resulting microcapsules are then coated on a neutral base paper sheet in the same manner as the reference sheet was coated. The sheet containing microcapsules from the second batch is designated as the modified sheet.

The modified sheet and the reference sheet are each combined with a developer CF sheet having an acid-leached bentonite-type clay coating to form a carbonless copying paper system. From a visual observation of each copying system, the system containing the modified sheet shows noticably less blush and offset then the system containing the reference sheet. The image intensity of the system containing the modified sheet is not significantly different than the image intensity of the system containing the reference sheet. Thus it may be concluded that the system containing the modified sheet having microcapsules according to the present invention yields an improved copying paper system.

EXAMPLE II

Microcapsules are prepared as in Example I except that a copolyamide material is used for the initial microcapsule walls instead of a homopolyamide material and the resulting microcapsules are tested in a carbonless copying paper system.

Again, two batches of microcapsules are prepared. In each batch, about 2.03 g of TPC, about 1.38 g of m-benzenedisulfonyl chloride and about 1.0 g of PTSMH are dissolved in about 30 g of DBP and the mix is emulsified with about 100 g of 2 percent Elvanol 50–42 solution for about two minutes. A second mixture of about 1.54 g DET, about 1.20 g sodium carbonate and about 40 ml water is then added to each emulsion. Each batch was stirred for about 20 hours to form microcapsules having a copolyamide encapsulating wall. The microcapsules from one batch are then coated on a paper sheet as in Example I to be used as a reference sheet. To the second batch, about 4.0 g of Apogen 401 is added and then stirred for about 3 hours to yield the microcapsules according to the present invention. These microcapsules are then coated on a paper sheet to yield a modified sheet. Each sheet is then combined with a recording CF sheet to yield a carbonless copying system. Again, as in Example I, the system having the modified sheet shows a reduced amount of blush and ghosting from an visual observation than the copying system containing the reference sheet.

EXAMPLE III

Microcapsules are prepared similarly to Example II except that a different type of copolyamide material is used to form a microcapsule wall. The resulting microcapsules are then utilized in a carbonless copying paper system.

Two batches of microcapsules are prepared. In each batch, about 1.52 g of TPC, about 1.52 g of isophthaloyl chloride and about 1.0 g of PTSMH are dissolved in about 30 g of DBP to yield a mixture which is subsequently emulsified in 100 ml of a 2 percent Elvanol 50–42 solution for about two minutes. To each batch is then added about 0.77 g of DET, about 0.6 g sodium carbonate in about 20 cc of water and a solution of about 1.71 g bisphenol A and about 0.60 g sodium hydroxide in about 20 cc water. Each batch is then stirred for about 20 hours to produce microcapsules having a copolyamide wall. The microcapsules of one batch are coated upon a paper sheet in the manner set forth in Example I to yield a reference sheet. To the second batch, about 4.0 g of Apogen is added and then stirred for about three hours to yield microcapsules according to the present invention. These microcapsules are then coated on a paper sheet in a manner similar to that of the reference sheet to yield a modified sheet. As in the above Examples, the modified sheet, when used in a carbonless copying paper system with a developer CF sheet, shows upon visual observation much less blush and ghosting than a similar system utilizing the reference sheet.

EXAMPLE IV

The microcapsules according to the present invention are prepared utilizing microcapsules made by a dual-wall type method as taught by the patent to Baxter previously mentioned and the resulting microcapsules incorporated into a carbonless copying system to thereby compare the properties of these microcapsules with microcapsules not utilizing the concepts of the present invention.

Two batches of microcapsules are prepared by the dual-wall type method. To prepare each batch, two solutions are formulated, the first by dissolving about 5.0 g of gum arabic in 150 g of water and the second by dissolving 5.0 g of gelatin of pig skin, (isoelectric point of 8) in about 150 g of water at about 50° C. The two solutions are then mixed in a blender and then a solution containing about 21 g of DBP, about 0.5 g of PTSMH, and about 0.02 g of TPC is added with agitation at moderate shear for about two minutes. About four drops of octyl alcohol are added to reduce foaming and then about 2 ml of a 40 percent formaldehyde solution is added. The resultant mixture is then allowed to cool to about 10° C. in a period of about 30 minutes to thereby form microcapsules. The microcapsule walls are then hardened by adjusting the pH of the mixture to about 9 with a ten percent sodium hydroxide solution. The microcapsules of one batch are coated on a paper sheet in the manner as set forth in Example I to produce a reference sheet. To the second batch about 6.0 g of Apogen 401 is then added and stirred for about two hours. The resultant microcapsules according to the present invention are then coated onto a paper sheet in similar fashion to produce a modified sheet.

A portion of each of the modified sheet and the reference sheet are then combined with a developer CF sheet to produce a carbonless copying paper system. Upon application of a marking pressure, the formed image has an image intensity of about 47.2 in the system containing the reference sheet, and an image intensity of about 52.5 in the system containing the modified sheet.

The remaining portions of the sheets are then placed on an accelerated blush test. In an accelerated blush test, the microcapsules are intentionally ruptured under a controlled pressure so as to thereby free the colorless dye precursor from the microcapsules. In one form of the test, the coated side of each sheet is placed against a conventional piece of paper and then passed through a manually operated test device which applies a gradually increasing pressure. The pieces of paper are removed and the coated test sheets then placed against a developer CF sheet. The two sheets are then placed in an oven at about 50° C. for about 1 week under a weight of about 2 PSI. Discoloration on the developer CF sheet is then measured using a photo volt reflection meter. A higher reflection value indicates less discoloration.

Upon completion of the accelerated blush test, the above mentioned portions of the reference sheet and the modified sheet had a reflectance value of about 71.5 and about 96.1 respectively. The higher value realized for the modified sheet containing microcapsules according to the present invention indicates a significant improvement over the reference sheet.

EXAMPLE V

Microcapsules are prepared by a urea-formaldehyde condensation method as disclosed by the patent to Mccaulay mentioned previously and a portion of these microcapsules are modified in accordance with the concepts of the present invention. The microcapsules are then used in carbonless copying paper systems and compared with systems containing microcapsules not in accordance with the present invention.

Two batches of microcapsules are prepared, one batch formed by conventional processes and the other according to the present invention. Each batch is prepared by forming a mixture of about 117.2 grams of 37% formaldehyde, about 444 grams of urea and about 7 grams of triethanolamine and then heating to about 70° C. for about 2 and one half hours to form a solution. To this solution is then added a solution of about 368 grams of sodium chloride and about 2,008 grams of water to yield a precondensate solution. Two portions of about 180 grams of the precondensate solution are used to form each batch. While stirring rapidly, a solution of about 1.2 grams PTSMH and 36 grams of DBP is dispersed into each batch. About 9 grams of Cab-o-sil M5 (fumed silica from Cabot Corp., Boston, Mass.) was also added to each batch as an emulsification aid. The pH of each batch is then reduced to about 2.5 using a 20% formic acid solution. The temperature is then raised to about 60° C. and mixing is continued for about 2 hours at this temperature. The temperature is then lowered to about room temperature and the pH is raised to about 7.5 using a 10% sodium hydroxide solution to yield the microcapsules. The microcapsules are then filtered, washed with water and then diluted with water to form a slurry. About 20 ml of a 10% polyvinylalcohol solution is then added to the slurry as a binder.

One batch of the resultant microcapsules is then coated on a paper sheet to form a reference sheet. To the second batch of microcapsules, about 6.0 g of Apogen 401 is added while stirring for about 3 hours and then coated on another paper sheet to yield a modified sheet. Portions of each of the modified sheet and the reference sheet are then tested for accelerated blush and image intensity as in Example IV. The results are as follows:

|  | Accelerated Blush | Image Intensity |
| --- | --- | --- |
| Reference Sheet | 63.4 | 50.0 |
| Modified Sheet | 87.8 | 53.3 |

As the data in the above table indicates, the modified sheet containing microcapsules according to the present invention produced less discoloration in the accelerated blush test while the intensity of the formed image when used in a carbonless copying system was not significantly affected.

EXAMPLE VI

Microcapsules and sheets having coatings containing the microcapsules are prepared as in Example I, the only difference being that the acetophenone oxime ether of Michler's hydrol is used as the dye precursor instead of PTSMH and the carrier for the precursor is R-300 instead of DBP. R-300 is the trade name of a commercial solvent of Kureha Corporation of America and is a mixture of isomeric diisopropylnaphthalenes.

In the manner as set forth in Example I, a batch of microcapsules is prepared having a pH of about 7.0 and portion of the batch is coated upon a paper sheet as a reference sheet. To about an 80 gram second portion of the batch, about 2.0 g of Apogen 401 is added and to another 80 gram portion of the batch, about 3.0 g of Apogen 401 is added. The two portions are then stirred for about 4 hours to produce microcapsules according to the present invention and then each portion is coated on a separate sheet to produce two modified sheets. When tested as set forth in the previous Examples, the following results are obtained:

|  | Accelerated Blush | Image Intensity |
| --- | --- | --- |
| Reference Sheet | 85.6 | 35.0 |
| 2.0 g Modified Sheet | 98.0 | 39.9 |
| 3.0 g Modified Sheet | 98.6 | 39.0 |

The above method of this Example is then repeated so as to produce another reference sheet and two additional modified sheets. The only difference is that the amount of sodium carbonate used in preparing each batch is about 1.05 grams so that the resultant pH of the initial microcapsule slurry is about 6.5. The following test results are obtained:

|  | Accelerated Blush | Image Intensity |
| --- | --- | --- |
| Reference Sheet | 86.5 | 39.0 |
| 2.0 g Modified Sheet | 96.8 | 38.8 |
| 3.0 g Modified Sheet | 99.0 | 38.5 |

The above method for making microcapsules is again repeated and another reference sheet and two modified sheets are prepared. In this instance, about 1.47 g of sodium carbonate are included in the initial mixture so as to yield a pH of about 8. The results are set forth below:

|  | Accelerated Blush | Image Intensity |
| --- | --- | --- |
| Reference Sheet | 82.9 | 38.0 |
| 2.0 g Modified Sheet | 98.4 | 41.5 |
| 3.0 g Modified Sheet | 99.1 | 40.3 |

As the above test data indicates, the modified sheets containing microcapsules according to the present invention yield a higher reflectance value than the reference sheets on an accelerated blush test while the image intensity is not significantly affected. The data also illustrate that the pH of the microcapsule slurry prior to modification with epoxy resin is not critical.

EXAMPLE VII

A number of batches of microcapsules are made according to an interfacial polycondensation method, each batch having a different colorless dye precursor included in the fill material. Some of the microcapsules of each batch are modified according to the present invention and then coated upon two types of paper sheets for comparative testing.

A number of batches of microcapsules are prepared by the method set forth in Example I except that about 1.0 g of various colorless dye precursors are included in the fill material rather than PTSMH. A portion of each batch of microcapsules is modified with Apogen 401 material as set forth in the Example and then each type of microcapsule is coated upon Appleton neutral base paper and also an Oxford acid base paper. Acid based paper is normally difficult to use as a substrate for CB sheets in carbonless copying systems as the acid nature of the paper tends to react with free dye precursor from the microcapsules and thereby cause significant discoloration of the sheet. The colorless dye precursors used in the various batches are selected from bis(1,4-benzene dimethanol) ether of Michler's hydrol (BDMH), p-nitrobenzyl ether of Michler's hydrol (NBEMH) N-(m-trifluorophenyl) leucoauramine (TFL) and 2-benzothiozole thio ether of Michler's hydrol (BTMH).

The results of an accelerated blush, image intensity, backprint, and CB color tests in terms of reflectance values are shown in the following table for both the reference sheet (R) and the modified sheet (M) of each batch containing the various dye precursors. In the table, "A" type paper is Oxford acid base paper and "N" type paper is Appleton neutral base paper.

| Precursor | Paper | Accelerated Blush | | Image Intensity | | Black Print | | CB Color | |
| --- | --- | --- | --- | --- | --- | --- | --- | --- | --- |
|  |  | R | M | R | M | R | M | R | M |
| BDMH | N | 70.2 | 99.0 | 45.9 | 46.8 | No | No | White | White |
| MBEMH | N | 72.5 | 96.8 | 48.0 | 52.9 | No | No | White | White |
| TFL | N | 62.3 | 93.6 | 54.0 | 54.0 | No | No | White | White |
| BTMH | N | 62.1 | 95.0 | 46.0 | 45.1 | No | No | White | White |
| BDMH | A | 71.7 | 99.0 | 45.6 | 50.5 | 88.8 | 93.7 | 92.0 | 97.8 |
| NBEMH | A | 75.6 | 98.5 | 51.8 | 58.3 | 87.9 | 92.2 | 91.3 | 96.1 |
| TFL | A | 70.8 | 96.3 | 60.0 | 60.3 | 88.2 | 91.1 | 87.5 | 95.5 |
| BTMH | A | 65.2 | 96.2 | 47.1 | 54.0 | 83.3 | 88.6 | 88.1 | 91.6 |

The backprint test either measures qualitatively or quantitatively the amount of discoloration on the sheet containing the microcapsules. Back print may be defined as self-imaging on a CB type sheet when the microcapsules thereon are intentionally or unintentionally impacted. The backprint on the acid paper was measured with a reflectance meter after one week using the same sheet which was used for accelerated blush test.

As the above results indicate, copying paper systems utilizing the modified sheets containing microcapsules according to the present invention have less discoloration on an accelerated blush test and have approximately the same image intensity as a carbonless copying system containing the reference sheets.

In addition, the CB sheet of acid base paper using microcapsules according to the present invention experiences less discoloration than the reference CB sheet.

EXAMPLE VIII

Microcapsules are produced according to the present invention and used in carbonless copying systems to investigate the effect on the CF side of a roll of CFB acid paper upon aging.

To prepare the microcapsules, about 32.6 parts of TPC, about 20 parts of Epon 1002 (an epoxy resin sold by the Shell Chemical Company) and about 10 parts of PTSMH are dissolved in about 300 parts of DBP. The solution is then emulsified in about 650 parts of a 3% Elvanol 50–42 until microdroplets of about 4.5 microns are obtained. To the emulsion is then added about 18.6 parts of DET, 9.6 parts of sodium carbonate in 110 parts of water. After stirring for about 12 hours, about 100 parts of the resultant slurry containing microcapsules is mixed with about 3.6 parts of Apogen 401 and allowed to react for about 3 hours to yield modified microcapsules.

About 100 parts of the original slurry and 100 parts of the modified slurry are then compounded with about 7.5 parts of starch granules, about 13.2 parts of 10% Vinol 325 solution (a fully hydrolyzed polyvinylalcohol sold by Air Products and Chemical Corporation), and about 5.7 parts of water. Each formulation of microcapsules is then coated on an opposite side of a roll of CF Oxford acid base bond paper. Each coated sheet then is wound into a roll and aged for about 3 months. After aging, the coated sheet containing unmodified microcapsules exhibits distinct CF discoloration from the CB side, while the coated sheet containing modified microcapsules according to the present invention has considerably less discoloration.

While the present invention has been described with reference to particular embodiments thereof, it will be understood that numerous modifications may be made by those skilled in the art without actually departing from the spirit and scope of the invention as defined in the appended claims.

We claim:

1. A method of making microcapsules comprising providing a dispersed phase of minute discrete droplets containing intended core material, forming generally continuous encapsulating walls about the minute droplets to thereby produce microcapsules, and reacting walls of the produced microcapsules with a methylolated epoxide of an epichlorohydrin/bisphenol A-type compound included in the continuous phase.

2. A method as set forth in claim 1 wherein the methylolated epoxide is reacted by adding an emulsion containing a methylolated epoxide to the continuous phase after formation of the microcapsules.

3. A method as set forth in claim 2 wherein the encapsulating walls are formed by interfacial polycondensation.

4. A method set forth in claim 2 wherein the formed encapsulating walls include polyamide.

5. A method as set forth in claim 2 wherein the encapsulating walls are formed by reacting diacid chloride included in the intended fill material with gelatin and gum arabic included in the continuous phase.

6. A method as set forth in claim 2 wherein the encapsulating walls of the microcapsules are formed by depositing an urea-formaldehyde condensate over the minute discrete droplets.

7. A method as set forth in claim 1 wherein the methylolated epoxide has the structural formula;

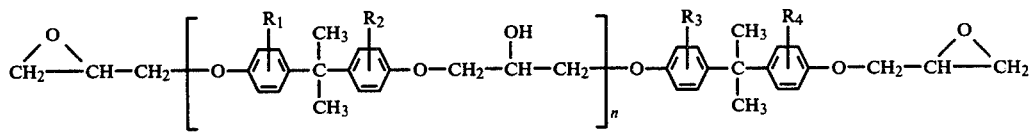

where $R_1$, $R_2$, $R_3$ and $R_4$ are selected from the group consisting of —H and —$CH_2OH$, provided that at least one of the R groups of the compound is —$CH_2OH$, and where n is an integer from 0 to 3.

8. A method as set forth in claim 7 wherein the methylolated epoxide has the structural formula;

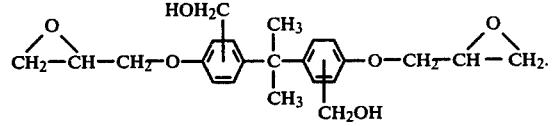

9. A method according to claim 1 wherein the intended fill material includes an initially colorless chemically reactive color forming dye precursor.

10. A method of making improved microcapsules comprising providing microcapsules each including a core of fill material and at least one generally continuous wall encapsulating said core and reacting material containing a methylolated epoxide of an epichlorohydrin/bisphenol A-type compound with the outer surfaces of the walls of the microcapsules.

11. In a method as set forth in claim 10 wherein the encapsulating wall is formed by interfacial polycondensation.

12. A method as set forth in claim 11 wherein the wall includes polyamide.

13. A method as set forth in claim 10 wherein the wall includes gelatin and gum arabic.

14. A method as set forth in claim 10 wherein the wall includes urea-formaldehyde condensate.

15. A method as set forth in claim 10 wherein the methylolated epoxide has the structural formula;

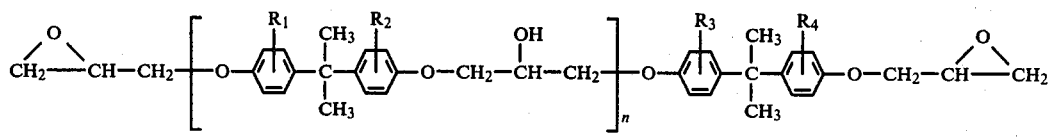

where $R_1$, $R_2$, $R_3$ and $R_4$ are selected from the group consisting of —H and —$CH_2OH$, provided that at least one of the R groups of the compound is —$CH_2OH$ and where n is an integer from 0 to 3.

16. A method as set forth in claim 10 wherein the material containing the methylolated epoxide is reacted with the walls by adding an emulsion containing the epoxy compound to the vehicle containing the microcapsules.

17. A method as set forth in claim 16 wherein the methylolated epoxide has the structural formula;

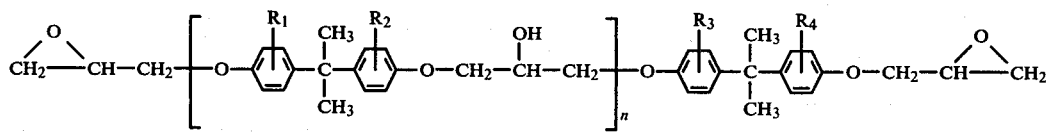

where $R_1$, $R_2$, $R_3$ and $R_4$ are selected from the group consisting of —H and —$CH_2OH$, provided that at least one of the R groups of the compound is —$CH_2OH$ and where n is an integer from 0 to 3.

18. A method as set forth in claim 17 wherein the epoxide has the structural formula;

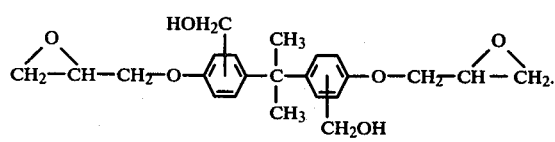

19. A method as set forth in claim 18 wherein the amount of epoxide added is from about 2 to about 20 wt. % of the dry weight of the microcapsules.

20. A method as set forth in claim 19 wherein the amount of epoxide added is from 2 to about 10 wt. % of the dry weight of the microcapsules.

21. A microcapsule comprising a core of fill material, at least one generally continuous wall encapsulating the core, and the reaction product of a methylolated epoxide of an epichlorohydrin/bisphenol A-type compound and material of the outermost wall being at least a portion of the outermost surface of the microcapsule.

22. A microcapsule as set forth in claim 21 wherein said fill material includes initially colorless, chemically reactive, color forming dye precursor.

23. A microcapsule as set forth in claim 21 wherein the material of the wall contains an urea-formaldehyde condensate.

24. A microcapsule as set forth in claim 21 wherein the material of the wall contains the reaction product of acid chloride, gelatin and gum arabic.

25. A microcapsule as set forth in claim 21 wherein the material of the wall contains polyamide.

26. A microcapsule as set forth in claim 22 wherein said fill material includes dye precursor selected from the group consisting of Michler's hydrol, derivatives of Michler's hydrol and mixtures thereof and a carrier for the dye precursor.

27. A microcapsule as set forth in claim 21 wherein the methylolated epoxide has the structural formula;

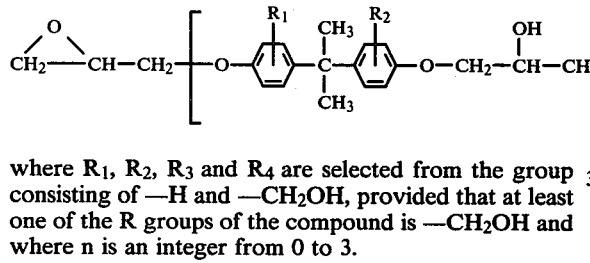

where $R_1$, $R_2$, $R_3$ and $R_4$ are selected from the group consisting of —H and —$CH_2OH$, provided that at least one of the R groups of the compound is —$CH_2OH$ and where n is an integer from 0 to 3.

28. A microcapsule as set forth in claim 27 wherein the methylolated epoxide has the structural formula;

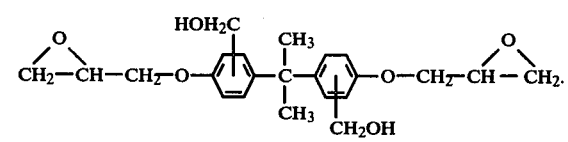

29. A microcapsule as set forth in claim 21 wherein the epoxide equivalent of the methylolated epoxide is from about 200 to about 750.

30. A microcapsule as set forth in claim 25 wherein the material of the wall includes polyterephthalamide.

31. A carbonless copying system comprising a substrate, a coating containing a plurality of microcapsules according to claim 22 over at least a portion of said substrate and material capable of reacting with said colorless color forming dye precursor contained in said microcapsules to produce a colored reaction product, the material in reactive contact with the microcapsules.

32. A carbonless copying system as set forth in claim 31 wherein said reactive material is contained in a coating on a second substrate contiguous to the substrate containing a plurality of microcapsules.

33. A carbonless copying system as set forth in claim 31 including a plurality of substrates having the microcapsules on one surface and a coating containing the reactive material on another surface.

34. A microcapsule comprising a minute, discrete droplet of fill material, an individual rupturable, generally continuous wall encapsulating the droplet, the wall comprising at least one layer of material, discontinuities in the outermost layer being closed by the reaction product of a methylolated epoxide of an epichlorohydrin/bisphenol A-type compound and material of the outermost layer.

35. A microcapsule as set forth in claim 34 wherein the fill material includes initially colorless, chemically reactive, color forming dye precursor.

36. A microcapsule as set forth in claim 34 wherein the material of the wall contains an urea-formaldehyde condensate.

37. A microcapsule as set forth in claim 34 wherein the material of the wall contains the reaction product of acid chloride, gelatin, and gum arabic.

38. A microcapsule as set forth in claim 34 wherein the material of the wall contains polyamide.

39. A microcapsule as set forth in claim 35 wherein said fill material include dye precursor selected from the group consisting of Michler's hydrol, derivatives of Michler's hydrol and mixtures thereof and a carrier for the dye precursor.

40. A microcapsule as set forth in claim 34 wherein the methylolated epoxide has the structural formula;

41. A microcapsule as set forth in claim 40 wherein the epoxide has the structural formula;

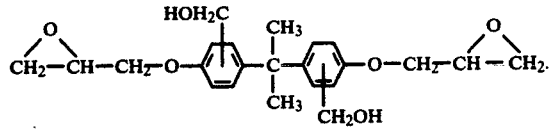

42. A microcapsule as set forth in claim 38 wherein the material of the wall includes polyterephthalamide.

43. A carbonless copying system comprising a substrate, a coating containing a plurality of microcapsules according to claim 35 over at least a portion of the substrate and material capable of reacting with said colorless color forming dye precursor contained in the microcapsules to produce a colored reaction product, the material in reactive contact with the microcapsules.

44. A carbonless copying system as set forth in claim 43 wherein the reactive material is contained in a coating on a second substrate contiguous to the substrate containing a plurality of microcapsules.

45. A carbonless copying system as set forth in claim 43 including a plurality of substrates having the microcapsules on one surface and a coating containing the reactive material on another surface.

where $R_1$, $R_2$, $R_3$ and $R_4$ are selected the group consisting of —H and —CH$_2$OH, provided that at least one of the R groups of the compound is —CH$_2$OH and where n is an integer from 0 to 3.

* * * * *